United States Patent [19]
Dallas

[11] 3,744,157
[45] July 10, 1973

[54] TYPING PACER
[75] Inventor: Richard Dallas, Corvallis, Oreg.
[73] Assignee: Owen Johnson, Mountain View, Calif.
[22] Filed: Jan. 27, 1972
[21] Appl. No.: 221,318

[52] U.S. Cl. .................................. 35/35 B, 40/352
[51] Int. Cl. ............................................ G09b 19/00
[58] Field of Search ..................... 40/352; 35/35 B

[56] References Cited
UNITED STATES PATENTS
2,782,528  2/1957  Wastl .................................. 35/35 B
3,055,122  9/1962  Taylor ................................. 35/35 B
3,126,648  3/1964  Strong et al. ....................... 35/35 B FOREIGN PATENTS OR APPLICATIONS
252,137  1/1963  Australia ............................ 35/35 B Primary Examiner—Robert W. Michell
Assistant Examiner—J. H. Wolff
Attorney—James S. Hight, Donald F. Frei et al.

[57] ABSTRACT

A typing pacer having visual mid-line and end-line indicators controlled by a selectively variable words-per-minute rate timer, and a visual stop indicator controlled by a selectively variable drill duration timer which also disables the rate timer. The printed pages of drill exercises each carry a vertical mid-line division.

18 Claims, 2 Drawing Figures

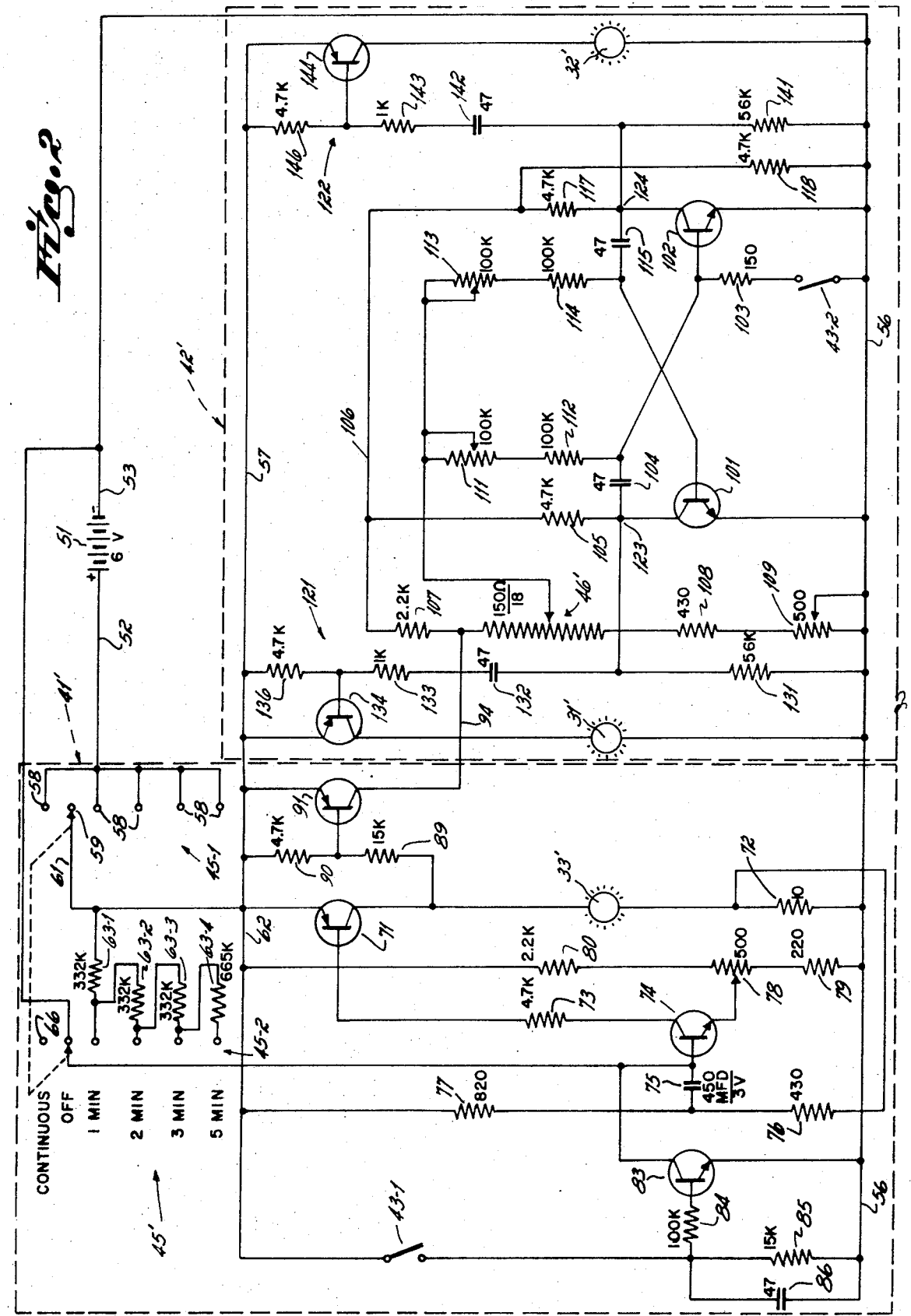

TYPING PACER

The present invention relates to pacing devices primarily for use in educational training courses such as typing and the like.

In the instruction of students in such skills as typing, shorthand, and the like where proficiency at faster and faster speeds is the primary goal, it is desirable that each student in daily practice be allowed to progress at his own rate. To aid in the training of students, automatic pacing devices are generally useful. However, where typical classes may for example contain in the area of 30 students, a plurality of separate and independent devices of this type are necessary to allow students to individually progress.

In training for typing and reading particularly, individual pacers have been employed. The basic principle of these devices has been to scan a printed page of drill or exercise at a predetermined rate calibrated to some words per minute scale. The most common type of pacer devices of the prior art employ mechanical pointers or shutters which physically move across the printed page forcing the student to follow. Another type of prior art device employs the same principle but with an optical scanner which directs a light beam along the printed page or illuminates only portions of the page in a timed sequential manner. Some such devices have employed audible indicators which sound at the end of the drill period.

It has been found that the most effective stimulus to effect typing improvement is a visual one. But devices which employ moving mechanical parts are expensive, cumbersome, and generally require considerable maintenance to keep them in good working condition. Furthermore, these devices usually require considerable power to operate thus requiring power cords which contribute to inconvenience and decreased portability.

The objectives of the present invention have been to provide an improved pacer which gives visual stimuli, employs no moving parts, and can be operated on internal power.

Accordingly, the present invention is predicated in part upon the concept of employing flashing visual indicators in the user's peripheral field of vision, which indicators are caused to flash in direct timed correlation to certain points on a printed page, signifying progress at a precise predetermined rate. The present invention is further predicated upon the concept of providing momentary visual indication in correspondence to certain positions along each printed line, specifically, the mid and end points of the line. The control of the visual indicators is achieved by a selectively variable solid state timer circuit controlled by a dial calibrated in words per minute corresponding to a printed page having predetermined word density. The overall control of the pacer is obtained by a settably variable total duration timer which disables the words per minute timer and energizes a visual stop indicator at the end of the selected timed drill interval.

It has been found that the present invention provides a far more effective educational training device than do the pacers of the prior art and one which is far more reliable and much easier to use.

These and other objectives and advantages of the present invention will be more readily apparent from the following detailed description of the drawings illustrating one preferred form of a typing pacer embodying principles of the present invention.

DESCRIPTION OF THE DRAWINGS

FIG. 2 is a schematic diagram of the timer and control circuitry of the pacer of FIG. 1.

Referring to FIG. 1, a typing pacer 10 is illustrated which includes a cabinet 11 and a drill book 12. The book 12 includes a plurality of printed pages 13 on which are printed typical typing drills. For example, these drills as illustrated may comprise a plurality of lines 14 each made up of a plurality of words which totals approximately 60 characters. The printed horizontal lines 14 are divided midway on the page by a vertical line 15 which divides the lines 14 into equal, that is substantially equal, 30-character parts. In this context, the number of characters generally includes punctuation marks and spaces.

Figure 1:
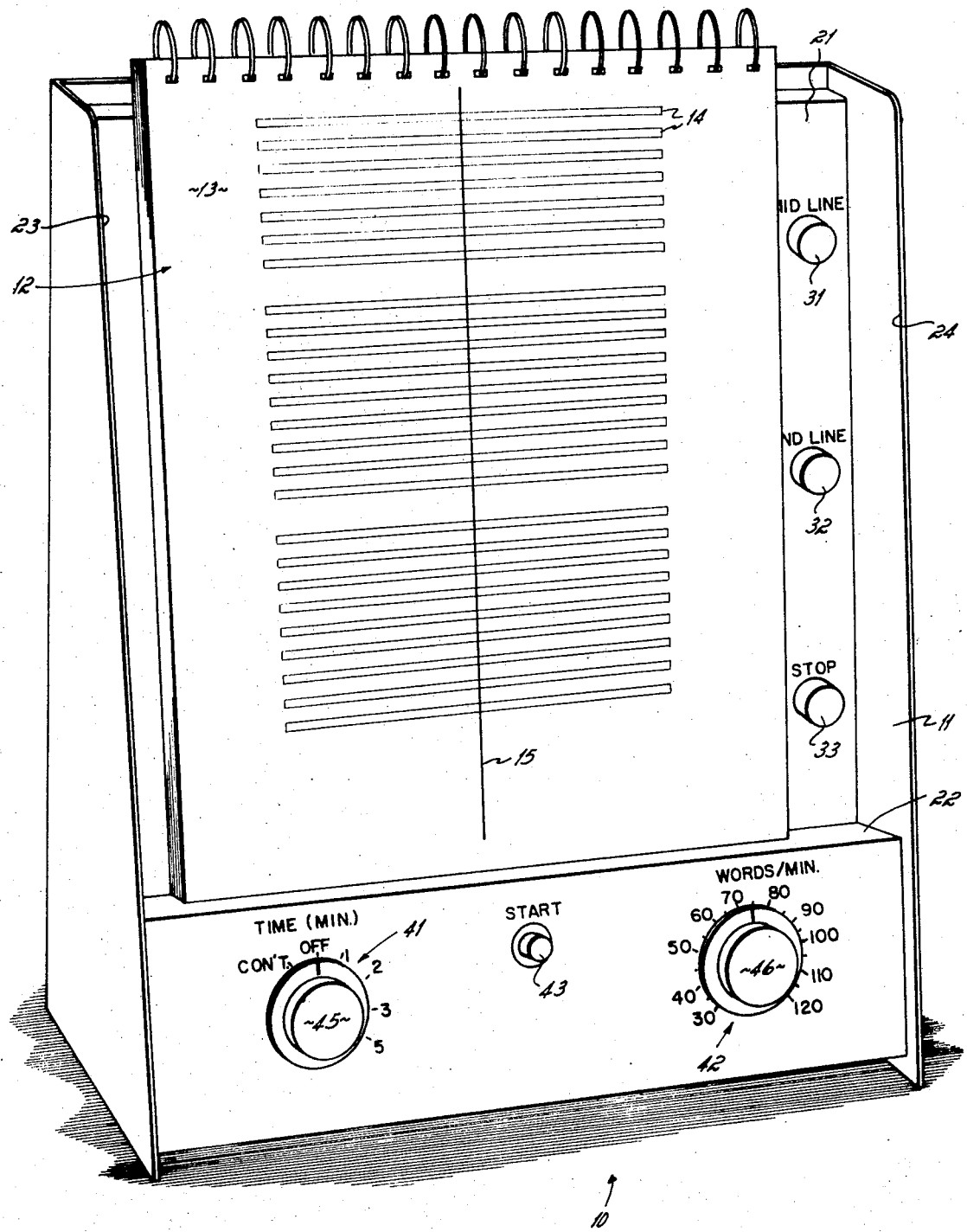
FIG. 1 is a perspective view illustrating one preferred form of a typing pacer embodying principles of the present invention.

The cabinet 11 provides a book support formed of an inclined support 21 against which the book 12 rests and a lower supporting ledge 22 which supports the lower edge of the book 12. Side guides 23 and 24 are also provided projecting outwardly from the panel 21 to constrain the book to the support 21. The book 12 normally rests slightly to the left of center of the support 21, and to the right of the book 12 are provided three panel indicator lights 31, 32 and 33. The lights are caused to blink in a timed fashion in correspondence to the desired position on the printed pages 13 at which a student should be during a given point of time during a typing drill. The lights operate under the control of a pair of timers 41 and 42. The timer 41 controls the overall duration of the drill while the timer 42 controls the rate at which the position indicators will operate. A start button 43 is provided to initiate the beginning of the drill.

The timer 41 includes a timer dial 45 which allows the operator to select the drill duration in minutes. The dial 45 is calibrated in 1, 2, 3 or 5 minute durations and is further provided with a continuous operation position and an off position. The word rate or word per minute selection dial 42 is provided with a selector switch 46 which is calibrated in five word per minute increments ranging from 30 words per minute to 120 words per minute.

The general operation of the pacer where the drill book 12 includes 60-character printed lines which converts by standard convention to 12 words per line proceeds as follows. The operation first sets the timer 41 to the total length of the drill by for example setting the selector 45 to the three minute position indicated by switch position 45–3 on the panel. He then sets the rate timer 42 by setting the dial 46 to for example the 60 word per minute position. He then initiates the drill by depressing the start push button 43 which initiates both timers. As the button 43 is depressed, the drill commences and the student begins typing the first line on the page 12. After 6 seconds, the mid-line light 31 will momentarily blink, indicating that at that point in time the student should be at the center of the top line of the page. After 6 more seconds, the end line light 32 will momentarily blink, indicating that the student should at that point in time be at the end of the first line. This process will continue with the mid-line light and end-line light 32 alternately blinking every six seconds until three minutes has elapsed. At the end of the 3 minutes, or after 30 lines have been paced through, the stop light 33 will light and the operation of the timers will terminate, indicating the end of the drill. It will be appreciated that the end of one line substantially corresponds in time to the beginning of the next line and therefore these terms are substantially equivalent in the present context.

The timer circuitry can best be understood by reference to FIG. 2. The timer circuitry includes a duration timer circuit 41' and the words per minute timer circuit 42'. The timer 41' includes the drill duration selector switch 45' and the stop light 33'. The words per minute timer 42' includes the word per minute selector switch 46', the mid-line indicator light 31', and the end-line indicator light 32'. The start switch 43 has a first set of contacts 43-1 connected into the duration interval timer circuit 41', and a normally opened set of contacts 43-2 connected in the circuit of the word per minute timer 42'. The power source for the timers is derived from a battery 51 connected between a positive lead line 52 and a negative lead line 53. The battery 51 is typically four size D battery cells connected in series to develop a six-volt potential for the circuits. The negative lead 53 is connected to the timer common line 56. The positive lead 52 is connected to each of the on contacts 58 of the first bank 45-1 of the switch 45'. The off contact 59 is an open circuit connection. The wiper 61 of the switch bank 45-1 is connected to the positive line 62 of the timer module 61' and to positive line 57 of timer module 42'. The second bank 45-2 of the switch 45' includes a series circuit of four resistors 63-1 through 63-4 connected between the wiper 61 of switch bank 45-1 and the 5 minute contact of switch bank 45-2. Each of the midpoints of the resistive series 63 is connected respectively to a different one of the 1-minute, 2-minute or 3-minute positions of the switch bank 45-2. The off position of the switch bank 45-2 is connected to the common line 56 and the continuous position 66 is an open circuit connection.

The timer circuit 41' includes a PNP power transistor 71 having its emitter connected to the positive line 62 and its collector connected respectively through the stop light 33' and a resistor 72 to the common line 56. The junction of the stop light 33' and the resistor 72 is connected respectively through a series of resistors 76 and 77 to the positive line 62. The base of the transistor 71 is connected through a resistor 73 to the collector of the transistor 74 which has its base connected through a capacitor 75 to the juncture of registers 76 and 77 and to the wiper of the bank 45-2 of switch 45'. The emitter of the transistor 74 is connected to the wiper of a calibrating potentiometer 78 which is connected in series between resistors 79 and 80, the series being connected across the lines 62 and 56 forming a voltage divider network. The base of the transistor 74 is also connected to the collector of an NPN transistor 83 which has its emitter connected to the common line 56 and its base connected through a resistor 84 and switch contact 43-1 to the power line 62. The juncture of resistor 84 and switch 43-1 is connected through a resistor 85 to common line 56 and also through a capacitor 86 to the common line 56.

The collector of the power transistor 71 is connected through a series of resistors 89 and 90 to the positive line 62. The junction of the resistors 89 and 90 is connected to the base of a PNP transistor 91 which has its emitter connected to the positive line 62 and its collector connected to an input 94 of the second timer module 42'.

The timer module 42' includes a bistable circuit comprising a pair of NPN transistors 101 and 102, both having their emitters connected to the common line 56. The base of transistor 102 is connected through a resistor 103 and switch contact 43-2 to the common line 56. The base of the transistor 102 is also connected through a capacitor 104 to the collector of transistor 101 which is in turn connected through a resistor 105 to a lead line 106. The lead line 106 is connected through a resistor 107 to the input line 94 which is in turn connected respectively through the potentiometer 46', a resistor 108, and a variable resistor 109 to the common line 56. The resistor 109 serves as a calibration for the potentiometer 46'. The wiper of the potentiometer 46' is connected through a series circuit which includes a variable resistor 111 and a fixed resistor 112 to the base of the transistor 102. The wiper of the potentiometer 46' is also connected through another series circuit which includes a variable resistor 113 and a fixed resistor 114 to the base of the transistor 101. The base of the transistor 101 is connected through a capacitor 115 to the collector of the transistor 102 which is in turn connected through a resistor 117 to the lead line 106. The line 106 is also connected through a resistor 118 to the common line 56. A pair of output circuits 121 and 122 is connected respectively to the outputs of the bistable circuit which are respectively output 123, which is the collector of transistor 101, and output 124, which is the collector of transistor 102. The output circuit 121 includes a resistor 131 connected between the output 123 and the common line 56 and a differentiating capacitor 132 connected between the output 123 and through a resistor 133 to the base of a PNP transistor 134. The transistor 134 has its emitter connected to the positive line 57 and its collector connected through the filament of the light 31' (which is the mid-line light) to the common line 56. The base of the transistor 134 is also connected through a resistor 136 to the positive line 57. Accordingly, the output 124 is connected through a resistor 141 to the common line 56 and through a differentiating capacitor 142 and a resistor 143 to the base of a transistor 144. The emitter of transistor 144 is connected to the positive line 57 and the collector of transistor 144 is connected through the filament of the end-line light bulb 32' to the common line 56. The base of the transistor 144 is also connected through a resistor 146 to the positive line 57.

The operation of the circuit is as follows. When the switch 45' is in the off position, the line 62 of timer 41' and line 57 of timer 42' are de-energized and the base of transistor 74 is connected to negative line 53 thus rendering transistor 74 non-conductive. All lights 33', 31' and 32' are off.

If the operator selects one of the limited time drills through positioning switch 45' to one of the timed positions, this connects resistance 63 to the base of the transistor 74 in circuit 41' which establishes a charging rate for capacitor 75. When the capacitor 75 reaches a predetermined charging voltage, transistor 74 is rendered conductive, causing transistor 71 to conduct, energizing the light 33'. This light will remain energized until the switch 45' is again switch to the off condition, discharging the capacitor 75. The conducting of transistor 71 removes the base voltage from the transistor 91, which in turn removes all current from the timer 42', causing operation of this timer to terminate.

When the switch 45' is switched to the continuous operation position, the positive line 62 of timer 45' is energized and the circuit connecting the base of transistor 74 is open. In either the case of continuous operation or timed operation, as the start button 43 is depressed, the switch 43-1 closes momentarily energizing transistor 83 which drives the base of transistor 74 negative, rendering it non-conductive and discharging capacitor 75. Capacitor 75 in conjunction with the resistance connected in series therewith through the bank 45-2 of switch 45' determines the time constant of the duration timer 41'. But when continuous operation is selected, since infinite resistance is connected in series with capacitor 75 through the terminal 66 of the switch, this capacitor 75 will never charge and thus the interval is infinite.

The depression of the start switch 43 also closes contacts 43-2 in the timer circuit 42' which sets the timer bistable circuit to the condition in which the output 124 is energized, thereby synchronizing the timer with the end of line or beginning of line condition. The circuit 42' operates as a conventional bistable multivibrator.

Even as the light 33' of the circuit 41' is de-energized, sufficient current passes through the resistor chain comprising resistors 89 and 90 to draw current through the base of the transistor 91 to energize the transistor and thus apply enabling voltage to the line 106 and through the potentiometer 46'. The charging current through the potentiometer 46' and through the resistors 111 and 112 and 113 and 114 determines the operating frequency of the multivibrator circuit comprising transistors 102 and 101 as they charge capacitors 104 and 115 respectively. The time constant of the circuit which includes capacitor 115 and resistors 113 and 114 determines the elapsed time allowed between the beginning of a line and the mid-line mark (15 in FIG. 1). Similarly, the time constant of the circuit which includes capacitor 104 and resistors 111 and 112 determines the elapsed time allowed between the mid-line mark 15 (FIG. 1) and the end of the line.

The momentary closing of switch 43 closes the contacts 43-2 which discharges capacitor 104 through resistor 103 to line 56. When switch 43-2 is released, transistor 102 is rendered conductive, driving output 124 negative and discharging capacitor 115 to render transistor 102 non-conductive, causing the output 123 to go positive. As capacitor 115 charges through resistors 113 and 114, eventually the voltage on the base of transistor 101 will reach a point such that the transistor is rendered conductive, driving the output 123 negative and causing a negative pulse to pass through the differentiating capacitor 132 to momentarily energize the transistor 134, applying momentary power to the filament of light 31', indicating the mid-line position. The conducting of transistor 101 causes capacitor 104 to discharge, removing base current from transistor 102, rendering it non-conductive and allowing output 124 to go positive. Similarly, as capacitor 104 changes through resistors 111 and 112, to the point where eventually the base voltage on transistor 102 is such that the transistor is rendered conductive, the output 124 goes negative causing a negative pulse to pass through differentiating capacitor 142 to cause transistor 144 to momentarily conduct, momentarily energizing the end line light 32', indicating that the end line time has been reached. This flip-flop action will continue until de-energized by timer 41' or, when continuous operation is selected, until the timer is set to the off position by a switch 45'.

It can be seen that the above provides a simple and reliable circuit for a typing pacer or other such device which accomplishes the advantages of the present invention and overcomes the disadvantages of the prior art pacer devices. The momentary flashing signals to light 31' and 32' from the differentiated outputs of the bistable multivibrator provide a highly effective pacing formation with low energy consumption. The all solid-state circuits function well from a self-contained power supply, operating from standard batteries and requiring no power cord. Additionally, the circuit can be precisely calibrated to a word per minute rate in direct correlation to the word density on the printed page. The circuit remains in calibration and does not require the maintenance and adjustment that the mechanical circuits require.

What is claimed is:

1. A typing pacer comprising:

a page having a plurality of vertically spaced horizontal lines of characters printed thereon, each of said lines having an equal number of characters;

said page having a vertical line thereon, said line dividing each of said printed lines into two equal character segments;

a pacer unit having a cabinet;

said cabinet having a page support portion and a panel portion thereon;

said support portion including an inclined vertical surface for said page with a lower horizontal ledge at the base thereof;

said panel portion including a region to the right of said support portion having a column of indicator lights mounted thereon and a region below said ledge having a plurality of switches mounted thereon;

said column of indicator lights including a mid-line light, an end-line light positioned below said mid-line light, and a stop light positioned below said end-line light;

said plurality of switches including a momentary start switch, a multiple position rate switch having a dial calibrated in words-per-minute, and a multiple position duration switch having a dial calibrated in minutes;

a solid state rate timer circuit within said cabinet, and having a first output connected to said mid-line light and a second output connected to said end-line light, said rate timer circuit having circuit means responsive to actuation of said start switch so as to actuate said rate timer circuit;

said rate timer circuit including a multivibrator having two alternative outputs and two equal time constant timing circuits each selectively variable in accordance with said rate switch setting to periodically invert said multivibrator at a rate per minute equal to the setting of said rate dial divided by the average number of words per half line on said printed page;

a pair of differentiator circuits, each connecting one each of said multivibrator outputs to a different one of said rate timer circuit outputs to momentarily energize said mid and end-line lights in response to the inversions of said multivibrator so as to establish a typing pacer rymth by sequentially illuminating the mid-line light and the end-line light once per character line;

a solid state duration timer circuit within said cabinet having an output connected to said stop light, and a delay circuit having an output connected to said duration timer output, said delay circuit being energized in response to the actuation of said start switch, the time constant of said delay circuit being selectively variable in accordance with the settings of said duration switch;

circuit means within said cabinet for controlling said rate timer circuit in response to said duration timer; and a battery for supplying power to said lights and circuits.

2. A typing pacer comprising:

a page having a plurality of vertically spaced horizontal lines of characters printed thereon, each of said lines having approximately an equal number of characters;

said page having a vertical line thereon, said line dividing each of said printed lines into two approximately equal character segments;

a pacer unit having a cabinet;

said cabinet having a support thereon for supporting and displacing said page for reading;

a plurality of stationary indicator lights mounted on said cabinet exteriorly of the periphery of said supported page so as to not underlie said supported page;

said plurality of indicator lights including a midline light correlated to said vertical line, an end-line light correlated to the right end of said printed lines of characters, and a stop light;

a plurality of switches including a momentary start switch, a multiple position rate switch having a calibrated dial and a multiple position duration switch having a calibrated dial;

a solid state rate timer circuit within said cabinet, and having a first output connected to said mid-line light and a second output connected to said end-line light;

said rate timer circuit including means operable to sequentially energize said mid-line and end-line lights in accordance with said rate switch setting to sequence at a rate proportional to the setting of said rate dial divided by the number of characters per half-line on said printed page so as to establish a typing pacer rhythm by sequentially illuminating the mid-line light and the end-line light once per character line; and a duration timer contained within said cabinet, said duration timer including means operative to energize said stop light at a predetermined time after said duration timer is actuated in accordance with the setting of said duration switch, said duration timer being actuated in response to said start switch.

3. A pacer according to claim 2 further comprising:
a signal differentiator in each of said rate timer outputs to said mid-line and end-line lights, whereby said lights are momentarily flashed when energized.

4. A pacer according to claim 2 further comprising:

means for energizing said rate timer in response to actuation of said duration timer and for deenergizing said rate timer after said predetermined time.

5. A typing pacer comprising:

a page having a plurality of vertically spaced horizontal lines of characters printed thereon, each of said lines having approximately an equal number of characters;

said page having at least one vertical line thereon, said line dividing each of said printed lines into segments;

a pacer unit having a cabinet;

said cabinet having a support thereon for supporting and displaying said page for reading;

a plurality of stationary indicator lights mounted on said cabinet exteriorly of the periphery of said supported page so as to not underlie said supported page, at least one of said lights correlated to said one vertical line, at least one of said lights correlated to the end of each horizontal line of characters;

a multiple position rate switch mounted on said panel and having a calibrated dial;

a rate timer within said cabinet, and having a plurality of outputs, each connected to a different one of said lights;

said rate timer including means operable to sequentially energize said lights in accordance with said rate switch setting to sequence at a rate which is a function of the setting of said rate dial, the number of words per line on said printed page, and the number and location of said vertical lines on said printed page, so as to establish a typing pacer rate for transversing each line of characters of said page by sequentially illuminating the vertical line light and the end-line light at least once per character line.

6. A pacer according to claim 5 wherein:
said timer includes a solid state timing circuit; and
said pacer includes self-contained power supply for said circuit and said lights, said power supply including a battery.

7. A pacer according to claim 5 further comprising:
a signal differentiator in each of said timer outputs to said lights.

8. A pacer according to claim 5 wherein:
said plurality of timer outputs and indicator lights is two in number and the time intervals between the sequential energizing of said lights are of approximately equal duration.

9. A pacer according to claim 5 further comprising:
a duration timer contained within said cabinet;
a multiple position duration selector switch mounted on said cabinet and operatively connected to said duration timer;
said duration timer being operative to generate a stop signal at a predetermined time after said duration timer is actuated;
a stop indicator operative in response to said stop signal; and
a manual start switch mounted on said cabinet for actuating said duration timer.

10. A pacer according to claim 9 further comprising:
means for energizing said rate timer in response to actuation of said duration timer and for deenergizing said rate timer in response to said stop signal.

11. A typing pacer comprising:

a cabinet having a support thereon for receiving and displaying a printed page having vertically spaced lines of characters thereon;

a plurality of stationary indicator lights mounted on said cabinet exteriorly of the periphery of a page supported on said cabinet so as not to underlie a page supported on said cabinet, each light correlated to a different horizontally spaced set of vertically aligned positions on said printed page;

a multiple position rate switch; and a selectively variable timer, said timer having a plurality of outputs each connected to a different one of said indicator lights;

said timer including means operable to energize each of said indicator lights in sequence at least once per character line at points in time correlated to said horizontally spaced sets of vertically aligned positions, said sequential energization of said lights being at a rate correlated to the setting of said rate switch, so as to establish a typing pacer rhythm.

12. A pacer according to claim 11 wherein:

said selectively variable rate timer includes a solid state timing circuit; and said pacer includes a self-contained power supply for said circuit and said lights, and power supply including a battery.

13. A pacer according to claim 11 further comprising:

a signal differentiator in each of said timer outputs to said lights.

14. A pacer according to claim 11 wherein:

said plurality of timer outputs and indicator lights is two in number and the time intervals between the sequential energizing of said lights are of approximately equal duration.

15. A pacer according to claim 11 further comprising:

a duration timer contained within said cabinet;

a multiple position duration selector switch mounted on said cabinet and operatively connected to said duration timer;

said duration timer being operative to generate a stop signal at a predetermined time after said duration timer is actuated;

a stop indicator operative in response to said stop signal;

a manual start switch mounted on said cabinet for actuating said duration timer.

16. A pacer according to claim 15 further comprising;

means for energizing said selectively variable rate timer in response to actuation of said duration timer and for de-energizing said rate timer in response to said stop signal.

17. A typing pacer comprising:

a page having a plurality of vertically spaced horizontal lines of characters printed thereon, each of said lines having an approximately equal number of characters;

said page having at least one vertical line thereon, said line dividing each of said printed lines into segments;

a pacer unit having a cabinet;

said cabinet having a support thereon for supporting and displaying said page for reading;

a plurality of stationary indicator lights mounted on said cabinet exteriorly of the pheriphery of said supported page so as not to underlie said supported page, at least one of said lights correlated to said one vertical line, at least one of said lights correlated to the end of each horizontal line of characters;

energizing means for sequentially energizing each of said lights at a predetermined rate at least once per character line so as to establish a typing pacer rhythm; and rate control means connected to said energizing means for selectively establishing said predetermined rate.

18. A typing pacer according to claim 17 wherein the number of lights is two, and the time intervals between the sequential energizing of said lights are of substantially equal duration.

* * * * *